United States Patent [19]

Seymour

[11] 4,109,953

[45] Aug. 29, 1978

[54] TONGS FOR GRIPPING GLASS SHEETS

[75] Inventor: Samuel L. Seymour, Oakmont, Pa.

[73] Assignee: PPG Industries, Inc., Pittsburgh, Pa.

[21] Appl. No.: 788,493

[22] Filed: Apr. 18, 1977

[51] Int. Cl.² .............................................. B66C 1/48
[52] U.S. Cl. .................................................... 294/118
[58] Field of Search .................... 294/86 R, 101, 106, 294/114, 118, 119, DIG. 1, DIG. 2

[56] References Cited

U.S. PATENT DOCUMENTS

| 2,310,869 | 2/1943 | Racz | 294/114 |
| 2,353,032 | 7/1944 | Hazouri et al. | 294/106 |
| 2,646,307 | 7/1953 | Phalin | 294/114 |
| 3,084,969 | 4/1963 | Davidson et al. | 294/118 |
| 3,089,727 | 5/1963 | Hay | 294/118 |
| 3,363,930 | 1/1968 | Webb | 294/118 |

*Primary Examiner*—Johnny D. Cherry
*Attorney, Agent, or Firm*—Edward I. Mates

[57] ABSTRACT

Tongs specially adapted for gripping thin glass sheets (4.5 millimeters and less) during thermal processing.

7 Claims, 10 Drawing Figures

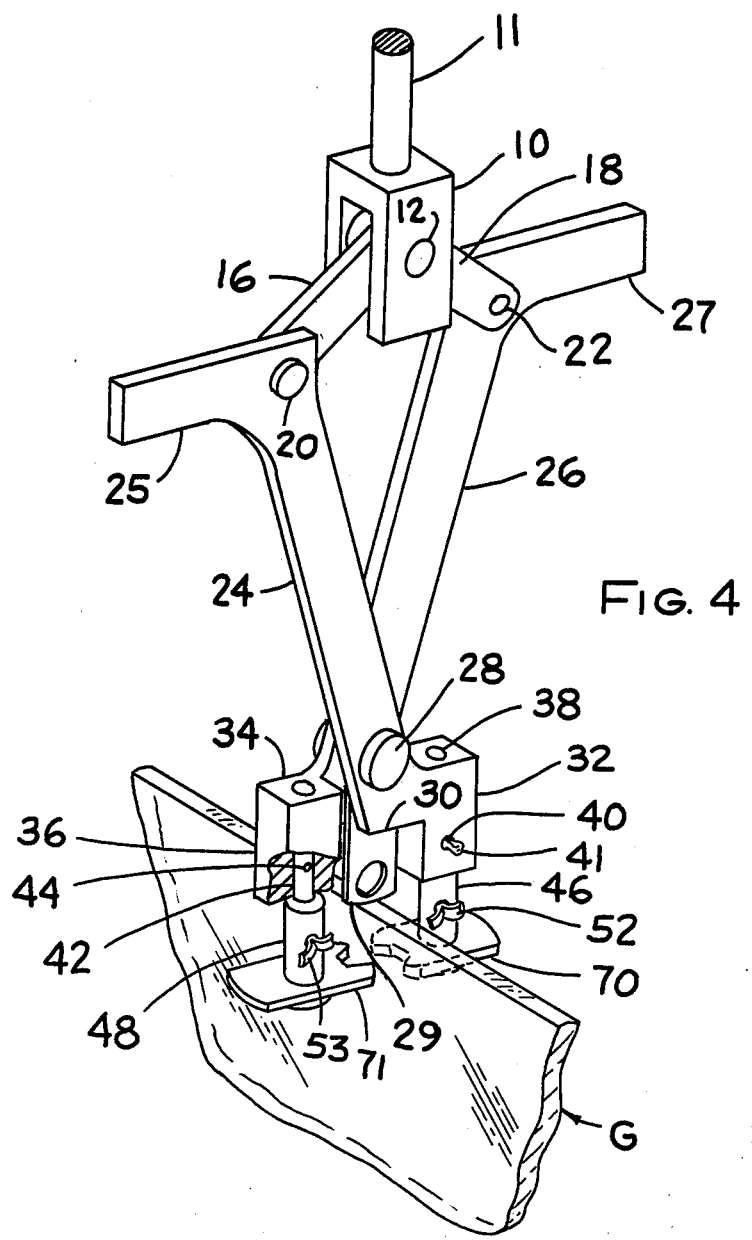
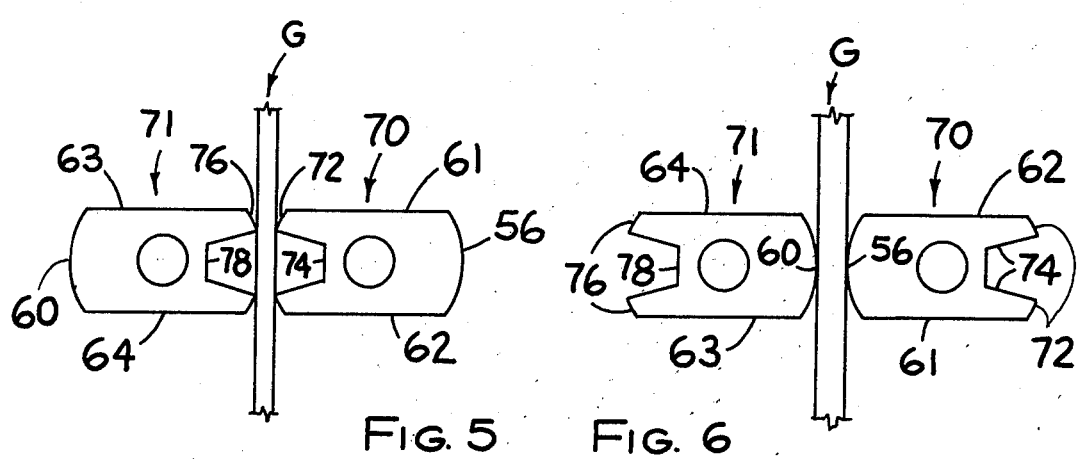
FIG. 4
FIG. 5  FIG. 6

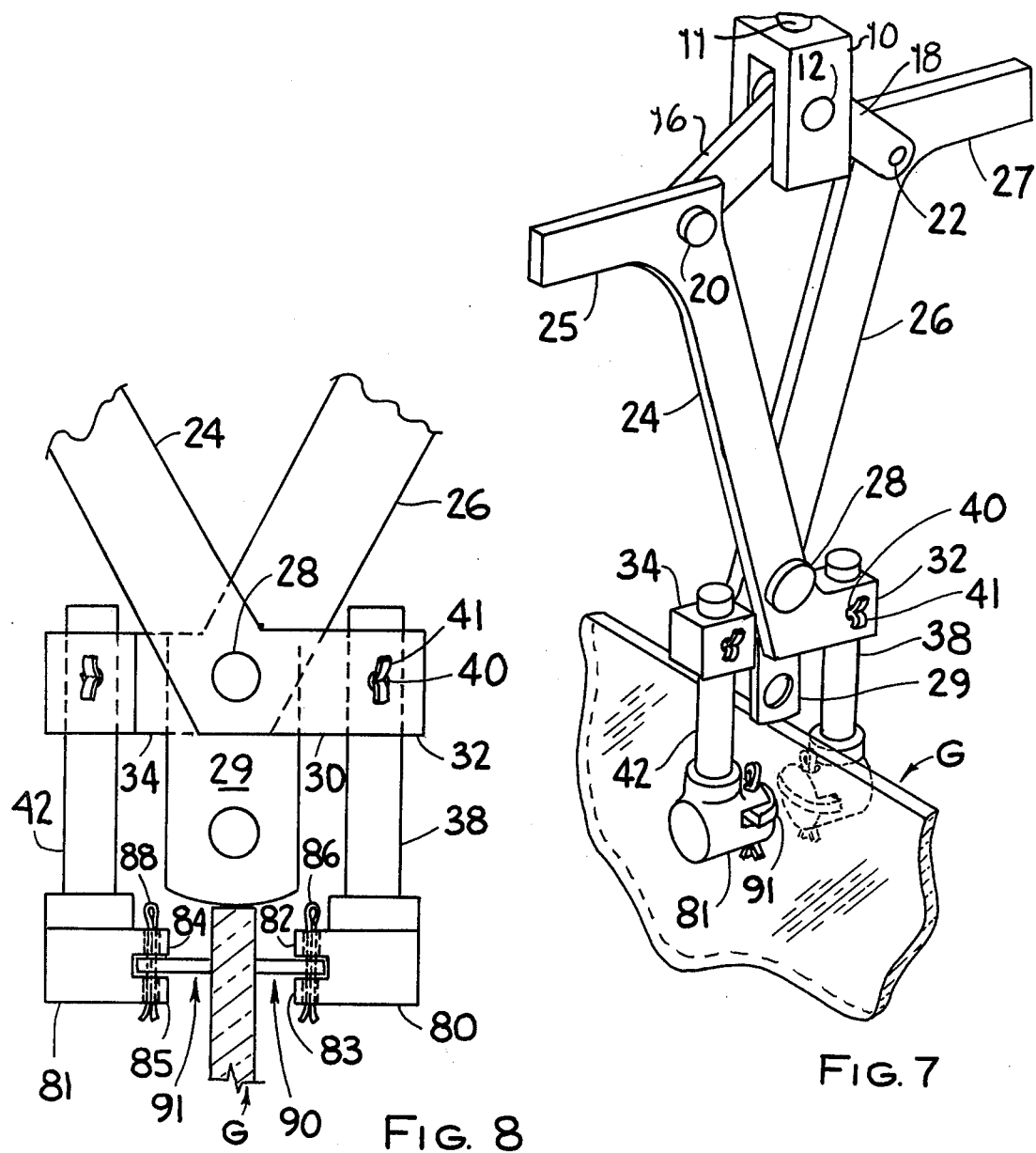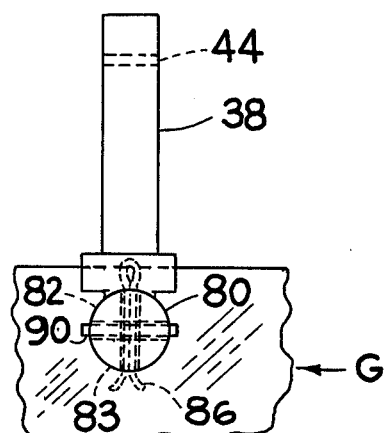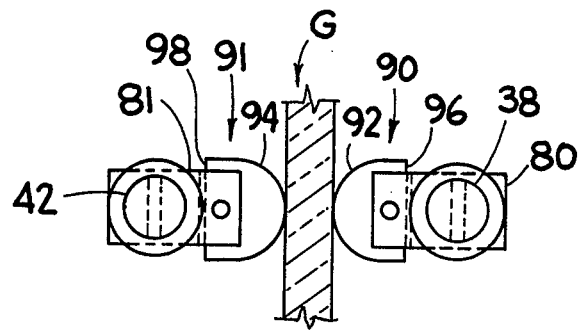

TONGS FOR GRIPPING GLASS SHEETS

BACKGROUND OF THE INVENTION

This invention relates to supporting glass sheets and specifically refers to an improved construction of tongs for gripping thin glass sheets during thermal treatment. Tongs have been used for supporting glass sheets in an essentially vertical plane for thermal treatment for gripping the opposite glass sheet surfaces near their upper edges. The tongs are supported from an overhead rail which extends through thermal treatment apparatus by means of a supporting clevis mounted to a carriage that rides on the rail.

During thermal treatment, the glass sheets are heated as uniformly as possible to an elevated temperature required for subsequent treatment. In tempering, the subsequent treatment involves quenching the heat-softened glass sheets as uniformly as possible. Glass gripping tongs have been provided with glass engaging elements as small as possible in order to minimize the localized obstruction to the flow of the quenching fluid.

Since glass sheets are heated to substantially the softening point during thermal treatment required for tampering or for certain coacting procedures, and since tongs for gripping glass sheets are provided with glass engaging elements that penetrate the heat-softened glass sheet surfaces and mar the latter, when the glass sheets are relatively thin so that they require more intensive heating to arrive at a subsequent treatment station at a temperature suitable for a subsequent treatment, a need has existed for tongs with glass engaging elements that do not penetrate the opposite surfaces of the glass sheet as deeply as the prior art tongs.

Disc-shaped glass engaging elements have been used successfully on glass gripping tongs for thermal treatment of glass sheets of previous commercial thicknesses (at least 4.8 millimeter) with reduced tong marking and penetration. However, the prior art tongs needed larger diameter discs to grip thinner glass sheets properly than the dics provided previously to grip glass sheets of greater thickness. The larger sized discs interfered with the flow of quenching fluid against the glass sheet surfaces in the vicinity of the disc-shaped glass engaging elements. This interference in free flow of quenching fluid caused lower compression stresses in the glass sheets in the vicinity of the glass engaging elements than elsewhere in the cooled glass, thus leading to weak regions.

Glass sheets are usually shaped between a pair of complementary pressing members that require clearances for the glass gripping tongs during the shaping operation. The thinner the glass sheet undergoing shaping, the more critical are the requirements for maximum size of notches or openings in the glass sheet shaping members. When the clearance notches normally provided in press bending molds are too large, the control of the shape of the glass sheets is lost in the vicinity of the notches. This produces glass sheets that do not conform to the specifications established by the customer. Glass sheets that deviate from curvature to a great extent are difficult to install.

DESCRIPTION OF THE PRIOR ART

U.S. Pat. No. 3,089,727 to Hay shows self-closing glass sheet gripping tongs provided with a pair of opposed glass sheet engaging elements in the form of disc-shaped members having smooth, peripheral edge surfaces opposing one another, and carried on the bottom of mutually pivoted lever arms. Means are provided on each lever arms, preferably in the form of a vertical pin secured to a horizontal arm extending beyond the common pivot pin of the tong arms, to pivot the disc-shaped member freely about the vertical pin or shaft. According to one embodiment of the invention of the Hay patent, the disc-shaped members that engage the glass sheet surfaces have a circular periphery. According to another embodiment of the invention patented by Hay, each of the disc-shaped members that engage the glass may include a relatively flat glass engaging portion.

SUMMARY OF THE INVENTION

The present invention provides further improvements in self-closing tongs for gripping glass sheets.

Among these improvements are means to enable the tongs to be received within smaller notches in the upper portion of glass shaping molds so as to minimize the unsupported portion of thin glass sheets during press bending. Another feature of the invention is to permit the same tongs to be used to grip glass sheets of different thicknesses in several embodiments of the present invention. Furthermore, a specific embodiment of the present invention provides means for readily distinguising the orientation of the glass engaging elements to be used for different thicknesses of glass sheets when the tongs are used for processing glass sheets of two different thicknesses. The present tongs interfere less with quenching fluid movement.

These and other benefits of the present invention will be readily understood after reading the description of several preferred embodiments of the present invention that follows.

BRIEF DESCRIPTION OF THE DRAWINGS

In the drawings that form part of a description of the present invention, wherein like reference numbers refer to like structural elements.

FIG. 4 is a view similar to FIG. 1 showing an alternate embodiment of the present invention wherein the glass engaging elements have features that distinguish the portion of the periphery of glass engaging elements designed to contact glass sheets that are relatively thin from the portion of their periphery designed to contact glass sheets that are relatively thick;

FIG. 5 is a view similar to FIG. 2 showing how the glass engaging elements of the second embodiment are oriented relative to a glass sheet in the processing of relatively thin glass sheets;

FIG. 6 is a view similar to FIG. 3 showing how the glass engaging elements of the second embodiment are oriented relative to the glass sheet being processed in the processing of relatively thick glass sheets;

FIG. 7 is a view similar to those FIGS. 1 and 4 showing a third embodiment of the present invention;

FIG. 8 is an enlarged fragmentary elevational view of the lower portion of the tongs depicted in FIG. 7;

FIG. 9 is a view taken at right angles to the view of FIG. 8. and

FIG. 10 is a view to the views of FIGS. 2, 3, 5 and 6 of the third embodiment of the present invention shown in FIG. 7.

DESCRIPTION OF THE PREFERRED EMBODIMENT

Figure 1:
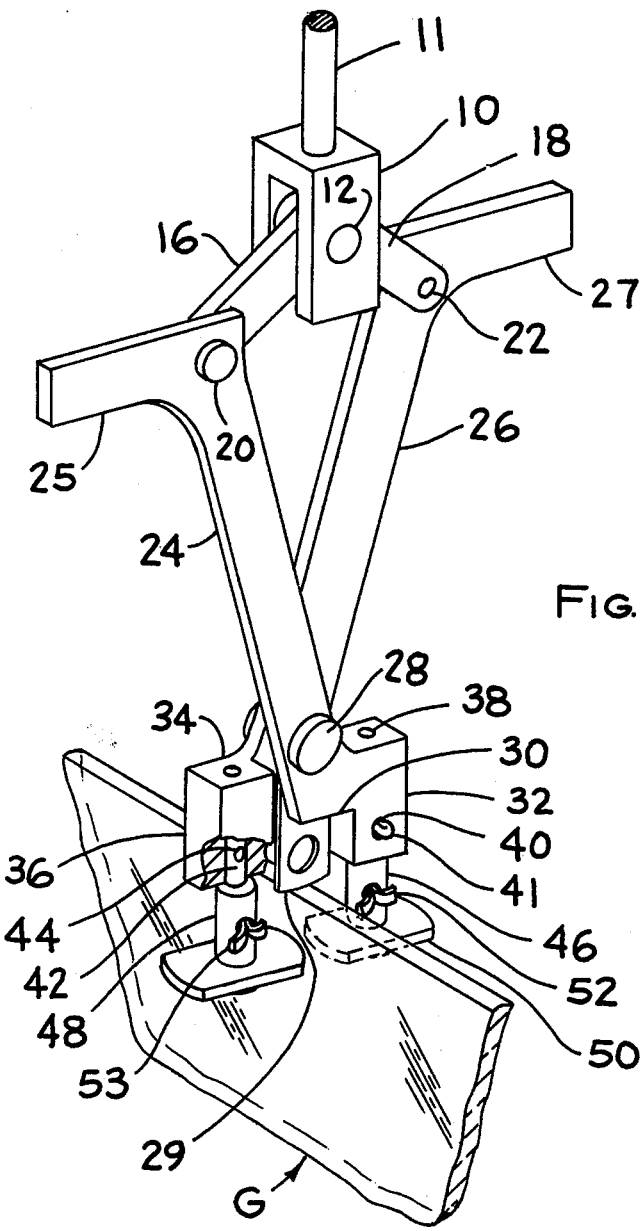
FIG. 1 is a perspective view of one embodiment of the present invention providing tongs for processing two different thicknesses of glass.

Referring to the drawings, reference number 10 refers to an apertured clevis connected by a connecting rod 11 to a carriage (not shown). The latter is movably supported on a monorail (not shown) which extends through a heating furnace and a fluid imparting apparatus, which may be either an air quenching station for tempering apparatus or a fluid spraying station for apparatus imparting a coating to the glass surface. Since the heating furnace and the quenching or spraying stations are not part of the present invention, they will not be described in detail.

The clevis aperture provides a support for a tong support pin 12 which is carried thereby. A pair of upper links 16 and 18 are pivoted to tong support pin 12 at their upper ends. At their bottom ends, links 16 and 18 carry one of a pair of link pins 20 and 22. Tong arms 24 and 26 are apertured at their upper portions to receive one or the other of the link pins 20, 22. Link pin 20 pivotally attaches the upper portion of tong arm 24 to the lower portion of upper link 16, whereas link pin 22 pivotally secures the lower portion of upper link 18 to the upper portion of tong arm 26.

Tong arm 24 has a horizontally extending finger 25 and tong arm 26 has a horizontally extending finger 27 for use in automatically unloading glass sheets from the tongs. Details of this unloading feature are recited in U.S. Pat. No. 3,084,969 to Davidson and Mitchell, the description of which is incorporated herein by reference.

A common hinge pin 28 pivotally secures tong arms 24 and 26 to each other at their lower portion. In addition, an apertured stop member 29 having a convexly rounded lower edge is pivoted to the common hinge pin 28 between the tong arms 24 and 26 to limit the uppermost position possible for the glass sheet G within the tongs. Further details of this feature and the benefits thereof are found in U.S. Pat. No. 2,991,114 to Robinson, the description of which is incorporated herein by reference. The bottom portion of tong arm 24 comprises an arm 30 constructed to terminate in a vertially apertured end portion 32. Similarly, the bottom portion of tong arm 26 comprises an arm 34 constructed to terminate in a vertically apertured end portion 36. Arms 30 and 34 are horizontal.

A vertical pin 38 is received within end portion 32. Pin 38 is diametrically apertured with an upper aperture (not shown) for alignment with aligned horizontal apertures 40 in end portion 32. Thus, pin 38 is fixed to end portion 32 by a cotter key 41 extending through the aligned apertures. A diametrically apertured vertical pin 42 is secured to the end portion 36 by means of a cotter key (not shown) extending through its upper aperture 44 aligned with aligned horizontal apertures (broken away) of end portion 36 in a similar manner as pin 38 is secured to end portion 32.

An apertured sleeve 46 is attached to pin 38 below horizontal arm 30. Similarly, another apertured sleeve 48 is attached to pin 42 below horizontal arm 34. An element 50 having a smoothly surfaced periphery of modified disc-like configuration is eccentrically mounted to the bottom of sleeve 46. Similarly, an identical element 51 having a smoothly surfaced periphery, also of modified disc-like configuration, is eccentrically mounted to the bottom of sleeve 48. The term "eccentrically mounted" means that the distance from the center of the pin to one portion of the glass engaging periphery of its corresponding member measured in the direction of the thickness of a glass sheet gripped between a pair of said members is different from the corresponding distance to another portion of said periphery when said element is rotated to engage a glass sheet with said other portion of said periphery, particularly a peripheral portion diametrically opposite to said one portion.

Each of the sleeves 46 and 48 is provided with diametrically opposed, horizontally aligned apertures adapted for alignment with lower apertures (not shown) in vertical pins 38 and 42. Cotter pins 52 and 53 extend through the horizontally aligned apertures of sleeves 46 and 48 and through the lower apertures of the vertical pins 38 and 42 to secure the respective sleeves 46 and 48 in one of two diametrically opposite orientations relative to the vertical pins 38 and 42. In this orientation, the elements 50 and 51 comprise the glass sheet engaging elements of the tongs. As stated previously, elements 50 and 51 have smoothly surfaced peripheries of modified disc-like configuration. The elements are eccentrically mounted with resepct to their support sleeves 46 and 48 in such a manner that they are provided with diametrically opposite, convexly curved peripheral portions 54 and 56 of element 50, and 58 and 60 of element 51. The convexly curved peripheral portions 54 and 56 of glass engaging element 50 are interconnected by straight sides 61 and 62. The convexly curved peripheral portions 58 and 60 of glass engaging element 51 are interconneced by straight sides 63 and 64.

Figures 2, 3:
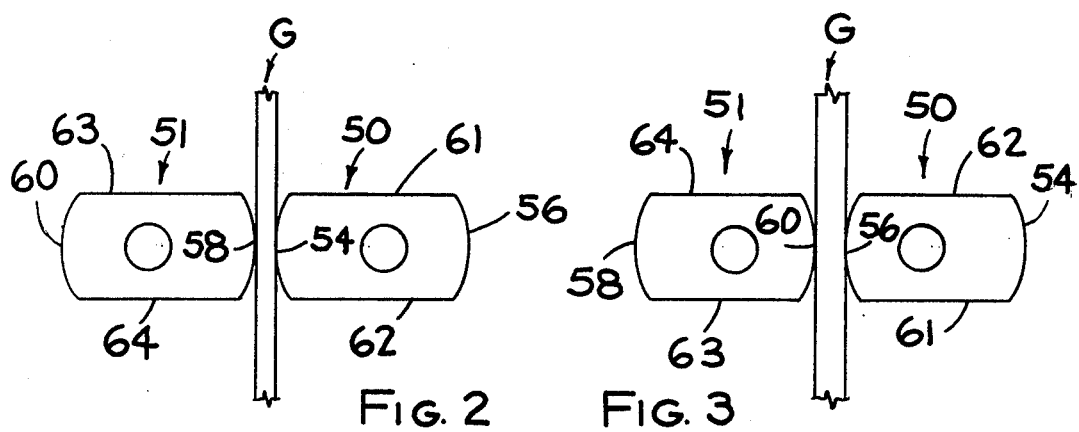
FIG. 2 is a bottom view showing how the glass engaging elements are oriented relative to the glass sheet to process relatively thin glass sheets.
FIG. 3 is a view similar to FIG. 2 showing the glass engaging elements of the tongs of FIG. 1 oriented to engage relatively thick glass sheets during thermal processing.

In the embodiment of FIGS. 1 to 3, the periphery of the glass engaging elements 50 and 51 have segments missing from the disc typical of the Hay patent mentioned in the statement of the pror art earlier in this specification. The cotter pins 52 and 53 serve means for supporting the glass engaging members 50 and 51 in one of two predetermined orientations relative to the tongs so that a convexly rounded peripheral portion of the glass engaging elements opposes a corresponding portion of the other element to engage a gripped glass sheet therebetween. The flat peripheral portions having the segments missing, such as peripheral portions 61 and 62 of glass engaging element 50 and the flat peripheral portions 63 and 64 of the glass engaging element 51, are out of contact with the gripped glass sheet.

The cotter pins 52 and 53 extend through the corresponding aligned horizontal apertures of the vertical pin 38 pin apertured sleeve 46 and of vertical pin 42 with apertured sleeve 48 to cause the convexly rounded peripheral portion 54 of element 50 to face the convexly rounded peripheral portion 58 of element 51. The tongs, with their glass engaging elements so oriented, are adatped to engage glass sheets of relatively less thickness than is the case when glass engaging element 50 is oriented with its rounded peripheral portion 576 opposing the rounded peripheral portion 60 of glass engaging element 51. In the latter position depicted in FIG. 3, the tongs are adapted for engaging the opposite surfaces of a relatively thick glass sheet. The reason for the suitability of the tongs to engage relatively thin glass sheets (approximately 3 millimeters or ⅛ inch thickness) when oriented as in FIG. 2 and relatively thick glass sheets (such as nominal thickness of 4 millimeters) when the glass engaging elements 50 and 51 are oriented as in FIG. 3 is because of the eccentric mounting of the glass engaging elements relative to their attachment to the element supporting sleeves 46 and 48. The distances from the centers of pins 38 and 42 to the convexly rounded peripheral portions 54 and 58 of the respective glass engaging elements 50 and 51 measured in the direction of the thickness of gripped glass sheet G are longer than the corresponding distances to their respective convexly rounded peripheral portions 56 and 60. Therefore, the orientations permit engagement by the tongs of glass sheets of different thicknesses when the tongs are in their freely hanging, self-closing positions with the glass engaging element located in a substantially horizontal plane and with their convexly rounded peripheral portions engaging the opposite major surfaces of the supported glass sheet G.

By modifying the disc-shaped configuration of the tongs, the various embodiments of the present invention provide less interference with the flow of tampering medium, such as cold air blasts, against the opposite surfaces of the glass sheet G that is gripped by the tongs, particularly in the vicinity of the glass engaging elements 50 and 51. Furthermore, the removal of segments from the tongs of the prior art improves the ability of the glass sheet in the vicinity of the glass engaging elements to be heated more consistently with the heating of the remainder of the body of the glass than is the case with relatively massive glass engaging elements of the prior art. Furthermore, the discs of the prior art provided more interference with the free flow of tempering medium of air blasts in the quenching station. Hence, the tendency of the glass to develop weaknesses, such as vents that tend to cause fracture in the production of tempered glass sheets, is reduced considerably compared to the breakage experienced prior to the present invention.

FIGS. 4 to 6 disclose an alternate embodiment of the present invention. The tong construction is identical to that of the embodiment of FIGS. 1 to 3 with the exception of a variation in the construction of the glass engaging elements. In the embodiment of FIGS. 4 to 6, the glass engaging elements are referred to by reference numbers 70 and 71.

The glass engaging elements 70 and 71 of the embodiment of FIGS. 4 to 5 are similar in construction to the glass engaging elements 50 and 51 of the embodiment of FIGS. 1 to 3 with the following exceptions. Instead of having a convexly rounded peripheral portion of larger diameter, such as the portion 54 of element 50 and the peripheral portion 58 of element 51, glass engaging element 70 is provided with a peripheral portion 72 of modified contour having convex end portion and an intermediate portion 74 of recessed configuration. Similarly, glass engaging element 71 differs from glass engaging element 51 of the previous embodiment by substituting a modified convexly rounded peripheral portion 76 having convex end portions and an intermediate recess portion 78.

Modifying the larger diameter convexly rounded pheripheral portions 72 and 76 of glass engaging elements 70 and 71 compared to their unmodified configuration of the corresponding glass engaging elements 50 and 51 of the first embodiment provides additional features beneficial to glass tempering that is not found in the first embodiment. First of all, an operator is able to orient the glass engaging elements into a position wherein the modified peripheral portions 72 and 76 face one another, each providing a pair of glass surface contacting elements that distinguish from the convexly rounded peripheral portions 56 and 60 that are a shorter distance from the centers of pins 38 and 42 in the direction of glass thickness. When so oriented, the elements assume a substantially horizontal orientation when the self-closing tongs engage the opposite surfaces of a relatively thin glass sheet, for example, a glass sheet having a nominal thickness of ⅛ inch (3 millimeters nominal thickness). This configuration is depicted in FIGS. 4 and 5. When the cotter pins 52 and 53 are removed and the glass engaging elements 70 and 71 are rotated 180° to present the continuous convexly rounded peripheral portions 56 and 60 against the opposite surfaces of a glass sheet G, because of the shorter distances from the pins to the continuously convexly rounded peripheral portions 56 and 60 compared to those of the modified portions 72 and 76, the glass engaging elements 70 and 71 are in approximate horizontal alignment and orientation when engaging a glass sheet of nominal thickness of 5/32 inch (approximately 4 millimeters).

The other benefit derived from the present modification is that the modified peripheral portions 72 and 76, by virtue of their respective recessed portions 74 and 78, provide more access for the tempering medium such as air blasts, to escape between the major surfaces of the glass sheet and the glass engaging elements. This feature is more important when thinner glass sheets are treated. It is more important to insure a rapid cooling throughout the entire area of thinner glass sheets than thicker glass sheets. Therefore, a single set of tongs can be used for processing glass sheets of two different thicknesses and the thinner glass sheets are provided with means on the tongs for facilitating cooling. It is understood that the configuration may be modified by having the peripheral portions 56 and 60 modified to a lesser extent than the sharply recessed portions 74 and 78 provided in the peripheral portions 72 and 76 so that an improved escape path for the tempering medium can be provided even though the tongs are handling thicker glass sheets of two sets of thicknesses. However, the variation must be such that the two sides of the glass engaging elements are readily distinguishable from one another.

A third embodiment of the present invention is disclosed in the embodiment depicted in FIGS. 7 to 10. In the third embodiment of the present invention, the vertical rods 38 and 42 are provided with upper apertures 44 only and have their lower end portions welded to respective small diameter rods 80 and 81 respectively. The latter have their inner end portions bifurcated to form bifurcations 82 and 83 for rod 80 and 84 and 85 for rod 81. The rods 80 and 81 so modified constitute a pair of bifurcated housings, each housing being provided with upper and lower bifurcations.

Each of the bifurcations of each of the housings 80 and 81 is provided with aligned vertical apertures to receive a cotter pin 86 and 88 through the respective sets of bifurcations.

A glass engaging element 90 is apertured to receive the cotter pin 86 and is pivotally supported between the upper bifurcation 82 and the lower bifurcation 83 of the bifurcated housing 80. Similarly, another apertured glass engaging element 91 receives cotter pin 88 between upper bifurcation 84 and lower bifurcation 85 of the bifurcated housing 81. Each of the glass engaging elements 90 and 91 of the embodiment of FIGS. 7 to 10 is provided with a convexly rounded peripheral portion 92 and 94, respectively, that makes contact with one or the other of the opposite major surfaces of the glass sheet G gripped therebetween when the self-closing tongs are freely suspended with the glass sheet therebetween. The remote ends of the glass engaging elements 90 and 91 are provided with straight peripheral portions 96 and 98 respectively. The straight peripheral portions 96 and 98 are constrained within the bifurcated housings 80 and 81 so as to make it impossible for any peripheral portion of the glass engaging elements 90 and 91 other than the convexly rounded peripheral portions 92 and 94 to make contact against the opposite major surfaces of the glass sheet gripped therebetween.

In the embodiment of FIGS. 7 to 10, the lower portion of the vertical pins 38 and 42 are enlarged to provide greater surface for attaching the pins to the bifurcated housings. This is preferably done by welding, although any suitale attachment capable of withstanding the temperature cycle experienced in hot glass sheet processing is suitable.

The benefits of the present invention were determined in several production tests. In one test where the production facility was press bending and tempering side lights having a nominal thickness of 5/32 inch (approximately 4 millimeters nominal thickness), 22.7 percent of production glass developed vents when processed with tongs provided with circular discs as the glass engaging elements. A test of approximately 20,000 pieces involvng six different patterns using the modified tongs having cut-down tong discs provided no vents whatsoever.

Futhermore, preliminary tests on processing parts having a thickness of ⅛ inch verified this reduction in tong vents that radiated out from the tong marks. This reduction in tong vents for processing glass sheets of ⅛ inch (nominal 3 millimeter) thickness and the complete elimination of tong venting in a production facility producing commercial parts having a nominal thickness of 5/32 inch (nominally 4 millimeters) provided proof positive of the benefits of the present invention.

A common feature of tongs modified according to the teachings of the present invention is that they have glass engaging elements of such a construction that their effect on the uniformity of heating glass sheets in the vicinity of their glass engaging locations of the furnace and their effect on the uniformity of applying cooling medium to quench the glass in the cooling station is reduced compared to the prior art tongs provided with glass engaging elements of disc configuration. At the same time, the glass engaging elements of the present invention are so constructed and arranged that they penetrate gripped glass sheets to a considerably lesser degree than the pointed elements of prior art tongs when the glass sheets are soft due to their heating in the furnace.

Another common feature of the glass engaging elements of the various embodiments is that they are eccentrically pivoted for limited rotation about a substantially vertical axis so that they are capable of making moving contact with the oposite major glass sheet surfaces. This slight rotational freedom reduces the tendency of the glass engaging elements to mar the glass and produce vents compared to what happens when the glass engaging elements are rigidly attached to the tongs.

In addition, the first two embodiments are capable of engaging glass sheets of a different thickness when their glass engaging elements are turned to an orientation approximately 180° opposite from the first orientation. This ability to handle two types of thicknesses without requiring a change of tongs represents a substantial savings in time, particularly in the processing of sample parts where different thicknesses of samples are required and the provision for a large inventory of tongs is not available.

RELATION TO OTHER APPLICATIONS

The tongs of the present invention are similar to those described and claimed in U.S. patent application Ser. No. 787,826 of George A. Iiams, filed Apr. 15, 1977 for TONGS FOR GRIPPING THIN GLASS SHEETS. However, the tongs of the present invention differ from those invented by George A. Iiams in that certain tongs of the present invention are suitable for gripping glass sheets of two different thicknesses and certain tongs of the present invention are provided with glass engaging elements having structural features that provide greater facility in the flow of tempering fluid and less interference with uniform heating than the glass engaging elements of the invention of George A. Iiams.

This disclosure represents a description of a preferred embodiment and various modifications thereof. It is understood that various changes may be made in modifying the prior art disc-like glass engaging elements having circular shapes rotatably mounted concentrically to their axes of rotation, such as modifying the glass engaging peripheral portions of the glass engaging elements to provide peripheral portions having equal radii of curvature measured from different axes of rotation as well as those having different radii of curvature mounted eccentrically to a common axis of rotation and providing various non-circular peripheral shapes to the glass engaging elements, without departing from the gist of the invention as defined in the claimed subject matter which follows.

I claim:

1. Self-closing tongs for gripping a glass sheet during thermal processing comprising a pair of tong arms, each tong arm comprising an upper tong arm portion and a lower tong arm portion, means pivotally connecting said tong arms together intermediate said upper tong arm portions and said lower tong arm portions, a pair of glass engaging elements carried by said tongs and movable into glass engaging positions against the opposite major surfaces of said glass sheet when said tongs are freely suspended, each of said glass engaging elements being of modified disc-like configuration comprising a convexly rounded, smoothly surfaced, peripheral portion that moves toward a convexly rounded, smoothly surfaced, peripheral portion of the other glass engaging element of said pair and at least one peripheral portion having a segmental portion missing therefrom, and element supporting means for each said element including pin means about which said element is eccentrically mounted for supporting said glass engaging elements on said tongs in pivotable relation thereto, means to limit the freedom of said pivoting so that said element is supported in such an orientation relative to said tongs so that said convexly rounded peripheral portions of said glass engaging elements oppose one another to engage said gripped glass sheet therebetween and the peripheral portion having said segmental portion missing is out of contact with said gripped glass sheet and means for supporting one of said glass engaging elements in its said orientation relative to one of said lower tong arm portions and means for supporting the other of said glass engaging elements in its said orientation relative to the other of said lower tong arm portions.

2. Self-closing tongs as in claim 1, wherein said lower tong arm portions each comprise a pin, a bifurcated housing fixed to the lower end of said pin and extending inward of said pin, aligned apertures in each of the bifurcations of said bifurcated housing, a cotter pin extending through said aligned apertures of each said bifurcated housing, and each of said glass engaging elements is pivotally mounted in eccentric relation to one or the other of said cotter pins between the bifurcations of its said associated bifurcated housing in an orientation such that its convexly rounded peripheral portion extends beyond the bifurcated end of said bifurcated housing and said peripheral portion having said segmental portion removed therefrom is loosely received within the inner end of said bifurcated portion of said bifurcated housing to permit limited rotational movement of said eccentrically mounted element relative to said bifurcated housing, whereby said convexly rounded peripheral portion engages one or the other major surface of said treated glass sheet and limited clearance is provided between the other peripheral portion of said element from which said segmental portion is missing and the inner wall of said bifurcated portion of said bifurcated housing.

3. Self-closing tongs for gripping a glass sheet during thermal processing comprising a pair of glass engaging elements carried by said tongs and movable into glass engaging positions against the opposite major surfaces of said glass sheet when said tongs are freely suspended, each of said glass engaging elements being of modified disc-like configuration comprising a convexly rounded, smoothly surfaced, relation peripheral portion that moves toward a convexly rounded, smoothly surfaced, peripheral portion of the other glass engaging element of said pair and at least one peripheral portion having a segmental portion missing therefrom, and element supporting means from each said element including pin means about which said element is eccentrically mounted for supporting said glass engaging elements on said tongs in pivotable relation thereto, means to limit the freedom of said pivoting so that said element is supported in such an orientation relative to said tongs so that said convexly rounded peripheral portions of said glass engaging elements oppose one another to engage said gripped glass sheet therebetween and the peripheral portion having said segmental portion missing is out of contact with said gripped glass sheet, wherein each of said elements is provided with a first convexly rounded peripheral portion spaced a relatively small distance from said pin means adapted to occupy a first position facing a corresponding first convexly rounded peripheral portion of the other of said elements to engage a relatively thick glass sheet therebetween and is provided with a second peripheral portion spaced a relatively large distance from said pin means diametrically opposite said first convexly rounded peripheral portion and adapted to occupy a second position facing a corresponding second peripheral portion of said other of said elements to engage a relatively thin glass sheet therebetween, and means carried by said tongs for supporting said elements in a selected one or the other of said positions.

4. Self-closing tongs as in claim 3, wherein each of said second peripheral portions comprises a peripheral portion comprising convexly rounded, smoothly surfaced, end portions thereof interconnected by a recessed intermediate peripheral portion between said convexly rounded end portions, whereby when said elements occupy said second positions, said convexly rounded end portions engage the opposite major surfaces of said glass sheet at two positions against each major surface.

5. Self-closing tongs for gripping a glass sheet during thermal processing comprising a pair of glass engaging elements of modified disc-like configuration, pin means attached to said tongs for supporting said glass engaging elements in such a manner that said glass engaging elements are oriented in a substantially horizontal plane when said tongs are freely hung to engage a glass sheet of predetermined thickness therebetween, said glass engaging elements each having a non-circular periphery including a first convexly shaped peripheral portion spaced a relatively short distance from said pin means in the direction of the thickness of said glass sheet and a second convexly shaped peripheral portion spaced a relatively long distance from said pin means in the direction of the thickness of said glass sheet, and means to maintain said glass engaging elements in one of two preselected orientations, one in which, when said tongs hang freely to grip a glass sheet therebetween, said first peripheral portions face one another to grip a relatively thick glass sheet therebetween with said glass engaging elements aligned in a substantially horizontal plane, and another in which said second peripheral portions face one another to grip a relatively thin glass sheet therebetween with said glass engaging element aligned in a substantially horizontal plane.

6. Self-closing tongs as in claim 5, wherein each of said second peripheral portions comprises a peripheral portion comprising convexly rounded end portions thereof interconnected by a recessed intermediate peripheral portion between said convexly rounded end portions, whereby when said elements occupy said second positions, said convexly rounded end portions engage the opposite major surfaces of said glass sheet at two positions against each major surface.

7. Self-closing tongs as in claim 5, wherein said peripheral portions are smoothly surfaced.

* * * * *

UNITED STATES PATENT AND TRADEMARK OFFICE
CERTIFICATE OF CORRECTION

PATENT NO. : 4,109,953

DATED : August 29, 1978

INVENTOR(S) : Samuel L. Seymour

It is certified that error appears in the above-identified patent and that said Letters Patent are hereby corrected as shown below:

Column 1, line 10, "for" (second occurrence) should be --by--.
Column 1, line 26, "coacting" should be --coating--.
Column 2, line 4, "arms" should be --arm--.
Column 3, line 5, after "a view", please insert --similar--.

Column 4, line 30, "resepct" should be --respect--.
Column 4, lines 37 and 38, "interconneced" should be --interconnected--.
Column 4, line 42, "pror" should be --prior--.
Column 4, line 43, after "serve", please insert --as--.
Column 4, line 56, "pin" (first occurrence) should be --with--.
Column 4, line 61, "adatped" should be --adapted--.
Column 4, line 63, "576" should be --56--.
Column 5, line 17, "element" should be --elements--.
Column 5, line 49, "4 to 5" should be --4 to 6--.
Column 5, line 56, "portion" should be --portions--.
Column 6, line 21, after "modified", please insert --peripheral--.
Column 7, line 21, "suitale" should be --suitable--.
Column 7, line 48, "of" (second occurrence) should be --in--.
Column 7, line 63, "oposite" should be --opposite--.
Column 8, line 15, after "April 15, 1977", please insert --, now U.S. Patent No. 4,081,193--.
Column 9, line 37, claim 3, after "surfaced", please delete "relation".

Signed and Sealed this

First Day of May 1979

[SEAL]

Attest:

RUTH C. MASON
Attesting Officer

DONALD W. BANNER
Commissioner of Patents and Trademarks